US012482997B2

(12) United States Patent
Sun et al.

(10) Patent No.: US 12,482,997 B2
(45) Date of Patent: Nov. 25, 2025

(54) COUPLER/STOP FOR MOUNTING TO CABLE

(71) Applicant: Legrand AVD, Dayton, OH (US)

(72) Inventors: Child Kuan Leok Sun, Irvine, CA (US); Jennifer Dawn Crotinger, Vista, CA (US); Terry Lynn Smith, Springboro, OH (US)

(73) Assignee: Legrand AVD, Dayton, OH (US)

( * ) Notice: Subject to any disclaimer, the term of this patent is extended or adjusted under 35 U.S.C. 154(b) by 617 days.

(21) Appl. No.: 17/942,767

(22) Filed: Sep. 12, 2022

(65) Prior Publication Data

US 2023/0006403 A1 Jan. 5, 2023

Related U.S. Application Data

(63) Continuation of application No. 16/837,220, filed on Apr. 1, 2020, now Pat. No. 11,444,419.

(60) Provisional application No. 62/967,967, filed on Jan. 30, 2020.

(51) Int. Cl.
*H01R 31/06* (2006.01)
*F16G 11/10* (2006.01)
*H01R 13/506* (2006.01)

(52) U.S. Cl.
CPC ............. *H01R 31/06* (2013.01); *F16G 11/10* (2013.01); *H01R 13/506* (2013.01)

(58) Field of Classification Search
CPC ........ H01R 31/06; H01R 13/506; F16G 11/10
See application file for complete search history.

(56) References Cited

U.S. PATENT DOCUMENTS 2,022,014 A * 11/1935 Grinten .................... G03C 5/10 430/395
3,802,011 A 4/1974 Castagnola
4,558,495 A 12/1985 Olsen
5,497,818 A 3/1996 Marcarelli
6,186,451 B1 2/2001 Benoit
(Continued)

FOREIGN PATENT DOCUMENTS

CN 201503927 6/2010
CN 104037564 A 9/2014
(Continued)

OTHER PUBLICATIONS

Office Action from related European Patent Application No. 21154456.4 issued Sep. 13, 2023.
(Continued)

*Primary Examiner* — Mark A Williams
(74) *Attorney, Agent, or Firm* — McCarter & English, LLP

(57) ABSTRACT

A coupler/stop for mounting relative to a cable is provided. The coupler/stop can be used in combination with an adapter system that facilitates convenient access to one or more adapters, e.g., DVI-D to HDMI adapter(s), Micro-HDMI to HDMI adapter(s), Mini-HDMI to HDMI adapter(s), Mini-DisplayPort to HDMI adapter(s), DisplayPort to HDMI adapter(s), VGA to HDMI adapter(s), MHL to HDMI adapter(s), and/or USB to HDMI adapter(s). The coupler/stop includes a pair of mating portions and a pair of inserts of selected diameter. A pair of mounting screws can be used for securing the mating portions to each other with the pair of inserts positioned therewithin.

18 Claims, 4 Drawing Sheets

(56) References Cited

U.S. PATENT DOCUMENTS

| | | | | |
|---|---|---|---|---|
| 7,469,854 | B2 | 12/2008 | Richardson | |
| 8,491,503 | B2 | 7/2013 | Zaiken et al. | |
| 9,784,338 | B1 * | 10/2017 | Parrett | F16G 11/10 |
| 10,041,565 | B1 | 8/2018 | Parrett et al. | |
| 10,637,177 | B2 * | 4/2020 | Murphy | H01R 13/512 |
| 10,797,454 | B1 * | 10/2020 | Lin | E05B 73/0005 |
| 11,444,410 | B2 | 9/2022 | Sun et al. | |
| 11,444,419 | B2 * | 9/2022 | Sun | H01R 13/60 |
| 11,575,235 | B2 * | 2/2023 | Crotinger | H01R 27/00 |
| 12,288,950 | B2 * | 4/2025 | Crotinger | H01R 31/06 |
| 2005/0134214 | A1 * | 6/2005 | Geiger | H01R 31/06 320/111 |
| 2008/0072633 | A1 | 3/2008 | Samuel | |
| 2017/0058569 | A1 * | 3/2017 | Liu | E05B 73/0005 |
| 2017/0149177 | A1 | 5/2017 | Gzybowski | |
| 2019/0249462 | A1 | 8/2019 | Jones et al. | |
| 2019/0277368 | A1 * | 9/2019 | Parrett | H01R 31/06 |
| 2023/0142842 | A1 * | 5/2023 | Crotinger | B65H 75/4434 439/638 |
| 2024/0332878 | A1 * | 10/2024 | Teh | H02J 7/0042 |

FOREIGN PATENT DOCUMENTS

| | | |
|---|---|---|
| CN | 209329236 | 8/2019 |
| EP | 21154456.4 | 1/2021 |
| EP | 211155456.4 | 1/2021 |
| FR | 2784729 A1 | 4/2000 |
| TW | M583632 | 9/2019 |

OTHER PUBLICATIONS

Crigger, Donella, 15 DIY Cord Organizers That Will Keep Your Wires Untangled Forever, https://www.onecrazyhouse.com/diy-cord-organizers/, Jan. 4, 2016.

B & H Foto & Electronics Corp., Digitalinx DL-AR HDMI to Mobile Content Adapter Ringer, 200-2019.

U.S. Appl. No. 62/967,967, filed Jan. 30, 2020.

U.S. Appl. No. 16/837,220, filed Apr. 1, 2020, U.S. Pat. No. 11,444,419 issued Sep. 13, 2022.

U.S. Appl. No. 16/837,239, filed Apr. 1, 2020, 2021/0242645 published Aug. 5, 2021.

Extended European Search Report dated Jun. 21, 2021 for European Patent Application No. 21154456.4.

* cited by examiner

COUPLER/STOP FOR MOUNTING TO CABLE

CROSS-REFERENCE TO RELATED APPLICATION

The present application is a divisional application of U.S. Non-Provisional patent application Ser. No. 16/837,220, which was filed on Apr. 1, 2020, which claims priority benefit to a U.S. Provisional Patent Application entitled "Systems for Providing Access to Plurality of Adapters" that was filed on Jan. 30, 2020, and assigned Ser. No. 62/967,967. The entire content of the foregoing patent applications is incorporated herein by reference.

BACKGROUND

1. Technical Field

The present disclosure is directed to an adapter system that facilitates convenient access to one or more adapters. The adapter system includes an elongated wire that generally features a plurality of adapters mounted/secured with respect thereto. The wire defines an attachment mechanism at a first end thereof, the attachment mechanism allowing the wire to be movably secured with respect to a cable. In use, the disclosed adapter system permits a user to readily access and individually utilize each of the adapters mounted/secured with respect to the wire on an as-needed basis.

2. Background Art

As is well known, day-to-day use of the myriad electronics that support personal and professional activities require access to and use of a wide range of adapters. For example, communications with and between electronics, such as desk top computers, laptop computers, tablet computers and smart phones, require different adapters that depend on the device(s) at the other end of the desired communication. In a particular use case, delivery of a presentation to a third party/group/audience often requires communication from a presenter's computer (laptop/tablet/smart phone) to an accessory monitor or projection screen and the appropriate adapter must be available to facilitate such communication or the presentation will not be possible.

It has become commonplace for individuals to accumulate a collection of adapters for inter-electronic communications required in their personal and professional lives. Various approaches have been taken to storing and transporting these adapters, e.g., storage and transport by way of bags, cases and the like. There have also been efforts to provide devices/assemblies to facilitate storage and transport of adapters, e.g., cable tie systems (see, e.g., U.S. Pat. No. 6,186,451 to Benoit), cord organizing systems (see, e.g., U.S. Pat. No. 7,469,854 to Richardson), DIY systems (see, e.g., "DIY Cord Organizers That Will Keep Your Wires Untangled Forever; https://www.onecrazyhouse.com/diy-cor-organizers/), and adapter keychains (see, e.g., U.S. Pat. Nos. 9,784,338 and 10,041,565 to Parrett et al.; Digitalinx Secure Adapter Ring available from Liberty AV Solutions).

In addition, systems have been disclosed that relate to cable winding/unwinding mechanisms (see, e.g., U.S. Pat. No. 9,521,227 to Kim, U.S. Pat. No. 7,183,743 to Geiger, CN 206388984U to Huawei Technologies Company, Ltd., and CN 209150369U to Dongguan Xinganhui Electronic Technology).

Despite efforts to date, a need remains for improved systems for storing, securing and providing ready access to adapter(s) for use in electronic communications on an as-needed basis. These and other needs are met by the disclosed systems and methods.

SUMMARY

The present disclosure provides advantageous systems for providing access to one or more adapters. The disclosed systems include an elongated wire that supports adapter(s) along the extent thereof. The wire is movably mounted with respect to a cable, e.g., an HDMI cable, a DisplayPort cable or another cable currently known or unknown, according to one of the following structural arrangements:

- The wire forms a loop around the cable and a coupler is applied to an overlapping region of the wire, e.g., in the field, to securely fix the loop in place relative to the cable. A coupler/stop is optionally mounted with respect to the cable to limit travel of the loop/wire relative to the cable.
- A ring that defines a tab extension with aperture is movably mounted with respect to the cable, and the wire forms a loop through the aperture in the tab extension. A coupler is applied to an overlapping region of the wire, e.g., in the field, to fix the loop in place relative to the tab extension/ring. A coupler/stop is optionally mounted with respect to the cable to limit travel of the loop/wire relative to the cable.
- A ring that defines a tab extension and the wire are joined relative to each other to define a subassembly. The ring is movably mounted with respect to the cable with the wire extending therefrom. A coupler/stop is optionally mounted with respect to the cable to limit travel of the loop/wire relative to the cable.

The adapter(s) are mounted/secured with respect to the wire/cable and may include indicia (e.g., color indicia) that facilitate identification of the adapter type. The adapter(s) may be movably mounted with respect to the wire/cable, and relative movement may be bounded by stops/couplers positioned at either end thereof. At the free end of the wire/cable, a pull-tab may be provided to facilitate interaction with the wire/cable and the associated adapters.

The present disclosure further provides an advantageous coupler/stop that accommodates cables of differing diameters by providing mating portions that receive/accommodate inserts of differing sizes, thereby permitting utilization with a range of cable diameters using the same mating portions. A cable wire gauge tool may be provided with the noted coupler/stop and inserts to facilitate selection of appropriate inserts for a particular cable gauge application.

Additional features, functions and benefits of the disclosed systems will be apparent from the detailed description which follows, particularly when read in conjunction with the appended figures.

BRIEF DESCRIPTION OF FIGURES

To assist those of skill in the art in making and using the systems disclosed herein, reference is made to the accompanying figures, wherein.

DESCRIPTION OF EXEMPLARY EMBODIMENTS

The present disclosure is directed to an adapter system that facilitates convenient access to one or more, e.g., a plurality of, adapters. The adapter system includes an elongated wire that generally features a plurality of adapters mounted/secured with respect thereto. The wire defines an attachment mechanism at a first end thereof, the attachment mechanism allowing the wire to be movably secured with respect to a cable. In use, the disclosed adapter system permits a user to readily access and individually utilize each of the adapters mounted/secured with respect to the wire on an as-needed basis. Moreover, the disclosed adapter system functions to securely mount the adapter(s), thereby safeguarding against potential loss, disappearance or misappropriation of the adapter(s).

Figure 1:
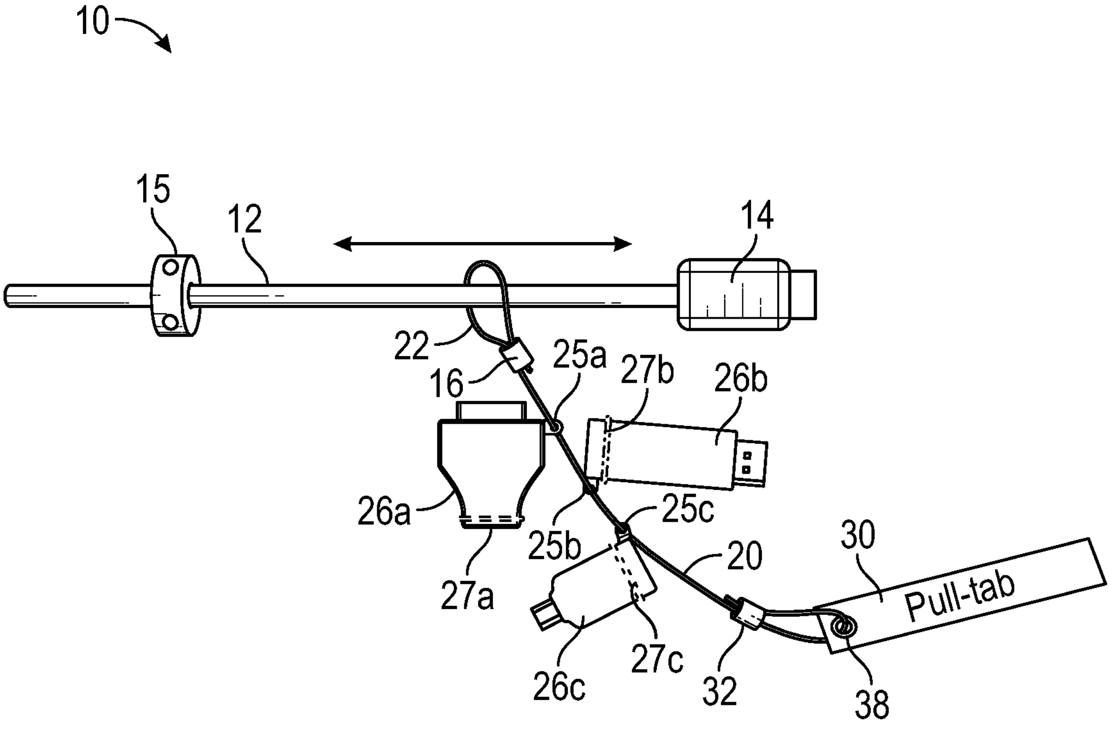
FIG. 1 is a perspective view of an exemplary system for providing access to a plurality of adapters according to the present disclosure.

With reference to FIG. 1, an exemplary adapter delivery system 10 is schematically depicted. System 10 includes an elongated cable 12 that includes a connector 14, e.g., an HDMI connector, at one end thereof. An optional coupler/stop 15 is mounted with respect to cable 12 in spaced relation relative to connector 14. System 10 further includes a rope or wire 20 that is movably mounted with respect to cable 12 by loop 22 formed at one end of wire 20. Of note, loop 22 is formed by encircling cable 12 with wire 20 and securing a coupler 16 to an overlapping region of wire 20. Coupler 16 may be advantageously fixed relative to wire 20 in the field, i.e., by a user of the disclosed system.

A plurality of adapters 26 are advantageously mounted/secured with respect to wire 20 at spaced intervals along the wire. Individual adapter(s) may be detachably mounted/secured with respect to wire 20. In exemplary implementations of system 10, adapters 26 may be movably mounted/secured with respect to wire 20, i.e., each adapter may be free to travel along wire 20.

Although system 10 includes three (3) adapters 26, the present disclosure is not limited by or to the depicted embodiment. Thus, system 10 may be implemented with as few as one (1) adapter and by more than three (3) adapters. Indeed, system 10 is generally implemented with a number and variety of adapters as may be desired by users in typical and/or specialized use cases.

Various securement mechanisms may be employed to mount/secure adapter(s) 26 relative to wire 20. For example, as shown in FIG. 1, adapters 26 may be mounted/secured relative to wire 20 by eyelets 25*a*, 25*b*, 25*c* that extend from the adapters 26*a*, 26*b*, 26*c*, respectively, and are joined to wire 20. Of note, eyelets 25*a*, 25*b*, 25*c* permit rotational freedom of movement for the adapters 26 relative to wire 20, thereby facilitating positioning of the adapter 26 relative to an electronic device(s) (not pictured) for insertion therein. In instances where the eyelets 25 permit longitudinal travel of adapters 26 relative to wire 20, further flexibility in positioning of adapters 26 relative to electronic devices is facilitated. The flexibility of wire 20—which is typically fabricated from steel and is between 24 and 14 gauge—further facilitates positioning of the individual adapters 26 for insertion in electronic devices. The eyelets 25 may also permit travel of adapters 26 along wire 20.

Eyelet 25 may be fabricated as part of an outer body of adapter 26, e.g., as part of the molding process, or may be retrofitted to an existing adapter 26, e.g., by way of an adhesive, sonic welding, mechanical clamping or the like. Eyelet 25 may allow passage of wire 20 through an opening defined thereby, or may be fixedly mounted relative to wire 20 in various ways, e.g., by way of crimping, adhesive or the like.

As shown in FIG. 1, coupler/stop 16 limits the travel of adapters 26 along wire 20 in the direction of cable 12 in implementations where eyelets 25 are not fixedly mounted/secured relative to wire 20, but instead allow travel of adapters 26 along wire 20. At the other free end of wire 20, a pull-tab 30 is mounted/secured with respect to wire 20 by a second coupler/stop 32. Pull tab 30 facilitates easy location of and interaction with system 10. In the exemplary implementation of FIG. 1, pull tab 30 includes a rivet/opening 38 that is dimensioned to allow passage of wire 20. Pull tab 30 is secured with respect to wire 20 by the doubling back of wire 20 after passage through rivet/opening 38 and securement of the doubled back portion of wire 20 with an original extent of wire 20, e.g., by way of second coupler/stop 32. Coupler/stop 32 advantageously functions as a stop for travel of adapters 26 along wire 20 (away from cable 12) when the eyelets 25 permit adapter 26 travel along wire 20.

Adapters 26 may take various forms. For example, adapters may include a combination selected from the group consisting of DVI-D to HDMI adapter(s), Micro-HDMI to HDMI adapter(s), Mini-HDMI to HDMI adapter(s), Mini-DisplayPort to HDMI adapter(s), DisplayPort to HDMI adapter(s), VGA to HDMI adapter(s), MHL to HDMI adapter(s), and/or USB to HDMI adapter(s). The present disclosure is not limited by or to the foregoing exemplary adapters, but may be effectively and advantageously employed with alternative and/or additional adapters, including adapters yet-to-be-developed and/or yet-to-be-commercialized.

Adapters 26 may advantageously include an indicia 27 that designates the type of adapter. Thus, for example, indicia 27 may take the form of a color band positioned on a portion of the adapter 26, although alternative forms of indicia may be employed. In the exemplary embodiment of FIG. 1, system 10 includes adapter 26*a* with indicia 27*a* (e.g., red band), adapter 26*b* with indicia 27*b* (e.g., green band), and adapter 26*c* with indicia 27*c* (e.g., yellow band). The correlation of color coding relative to adapter type may be provided by a key, or may become widely known in the industry, e.g., through industry practice, thereby allowing a user to easily identify the adapter needed for a particular device/application.

Of note, system 10 advantageously permits travel/translation of loop 22 of wire 20 along cable 12, as depicted by the two-headed arrow above cable 12 in FIG. 1. The extent of travel/translation is limited by connector 14 and typically by coupler/stop 15. Relative motion of wire 20 relative to cable 12 enhances the ability of users to position an adapter 26 for insertion relative to an electronic device (not pictured) using the disclosed system. In addition, the flexibility afforded users by allowing loop 22 to be formed in the field allows the portion of the system associated with wire 20 to be movably secured relative to a cable 12 selected by the user based on site-specific considerations, e.g., the accessibility and expected functionality of cable 12 as compared to other cable(s) that may be available at the site.

Figure 2:
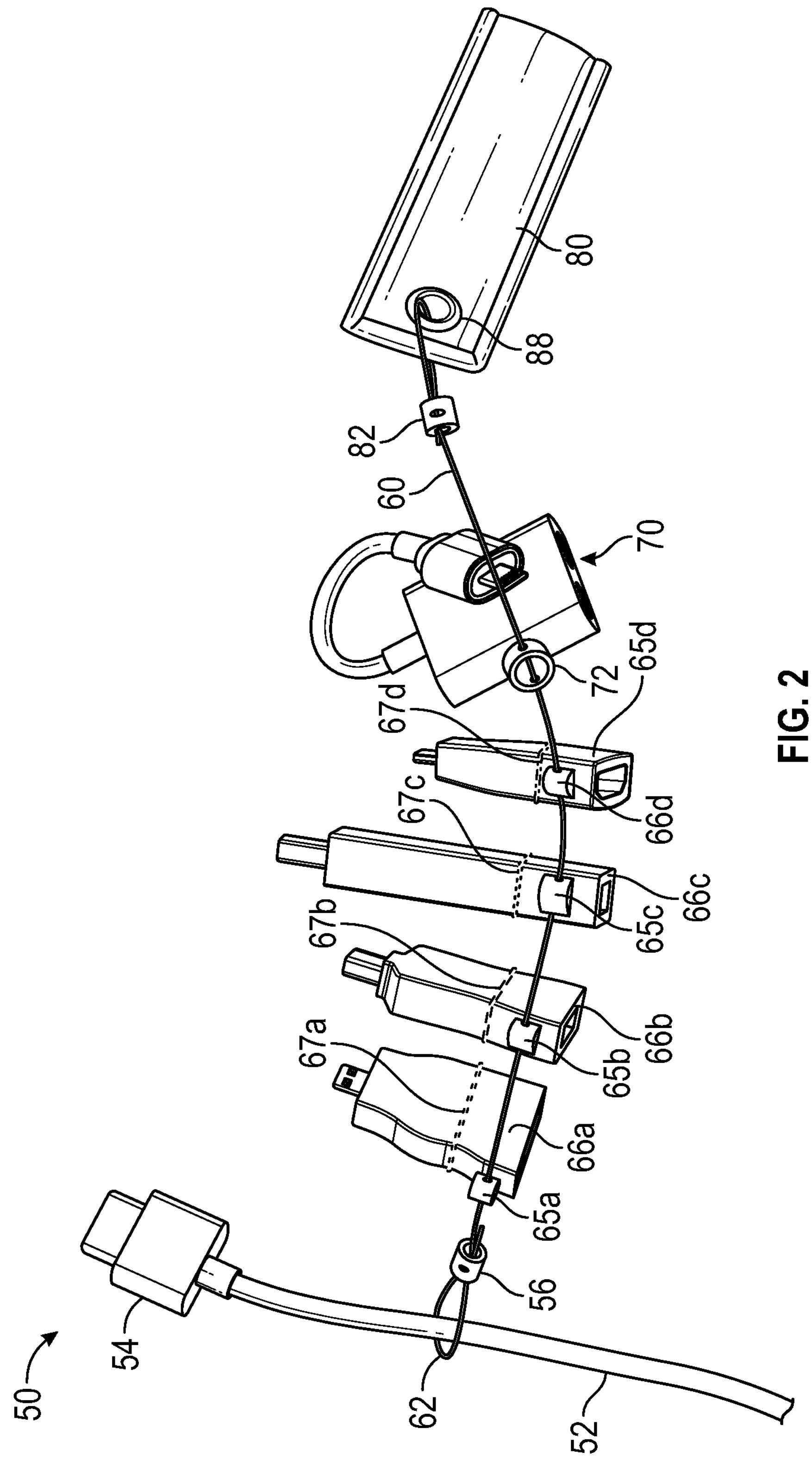
FIG. 2 is a perspective view of an alternative exemplary system for providing access to a plurality of adapters according to the present disclosure.

Turning to FIG. 2, an alternative system 50 for providing access to adapters 66 is depicted according to the present disclosure. System 50 includes an elongated cable 52 that includes a connector 54, e.g., an HDMI connector, at one end thereof. System 50 further includes a rope or wire 60 that is movably mounted with respect to cable 52 by loop 62 formed at one end of wire 60. Of note, loop 62 is formed by encircling cable 52 with wire 60 and securing a coupler 56 to an overlapping region of wire 60. Coupler 56 may be advantageously fixed relative to wire 60 in the field, i.e., by a user of the disclosed system.

A plurality of adapters 56 are advantageously mounted/secured with respect to wire 60 at spaced intervals along the wire. Individual adapter(s) may be detachably mounted/secured with respect to wire 60. In exemplary implementations of system 50, adapters 66 may be movably mounted/secured with respect to wire 60, i.e., each adapter may be free to travel along wire 60.

In addition to adapters 66, wire 60 also supports an add-on accessory mounting member 72 for securing a Lightning dongle 70 (Apple) or any other dongle that a user may wish to secure relative to wire 60, i.e., dongles that do not include an eyelet or other predefined attachment mechanism as disclosed herein.

As shown in FIG. 2, adapters 66 are mounted/secured with respect to the wire 60 based on wire 60 passing through apertures formed in tabs 65*a*, 65*b*, 65*c*, 65*d* that extend from adapters 66*a*, 66*b*, 66*c*, 66*d*, respectively. Tabs 65 are generally molded as part of the adapters 66, but retrofitting of tabs 65 onto adapters 66 may be undertaken, e.g., by way of adhesive, sonic welding, mechanical clamping or the like.

Tabs 65 permit rotational and longitudinal freedom of movement for adapters 66 relative to wire 60, thereby facilitating positioning of the adapters 66 relative to an electronic device(s) (not pictured) for insertion therein. The flexibility of wire 60—which is typically fabricated from steel at between 24 and 14 gauge—further facilitates positioning of the individual adapters 66 for insertion in electronic devices.

Although system 60 includes four (4) adapters 66 (and a Lightning dongle), the present disclosure is not limited by or to the depicted embodiment. Thus, system 60 may be implemented with as few as one (1) adapter and by more than four (4) adapters (with or without the Lightning dongle). Indeed, system 60 is generally implemented with a number and variety of adapters and dongles as may be desired by users in typical and/or specialized use cases.

As shown in FIG. 2, coupler/stop 56 limits the travel of adapters 66 along wire 60 in the direction of cable 52. At the other free end of wire 60, a pull-tab 80 is mounted/secured with respect to wire 60 by a second coupler/stop 82. Pull tab 80 facilitates easy location of and interaction with system 50. In the exemplary implementation of FIG. 2, pull tab 80 includes a rivet/opening 88 that is dimensioned to allow passage of wire 60. Pull tab 80 is secured with respect to wire 60 by the doubling back of wire 60 after passage through rivet/opening 88 and securement of the doubled back portion of wire 60 with an original extent of wire 60, e.g., by way of second coupler/stop 82. Coupler/stop 82 advantageously functions as a stop for travel of adapters 86 along wire 60 (away from cable 52).

Adapters 66 may take various forms. For example, adapters may include a combination selected from the group consisting of DVI-D to HDMI adapter(s), Micro-HDMI to HDMI adapter(s), Mini-HDMI to HDMI adapter(s), Mini-DisplayPort to HDMI adapter(s), DisplayPort to HDMI adapter(s), VGA to HDMI adapter(s), MHL to HDMI adapter(s), and/or USB to HDMI adapter(s). The present disclosure is not limited by or to the foregoing exemplary adapters, but may be effectively and advantageously employed with alternative and/or additional adapters, including adapters yet-to-be-developed and/or yet-to-be-commercialized.

Adapters 66 may advantageously include an indicia 67 that designates the type of adapter. Thus, for example, indicia 67 may take the form of a color band positioned on a portion of the adapter 66, although alternative forms of indicia may be employed. In the exemplary embodiment of FIG. 2, system 50 includes adapter 66*a* with color indicia 67*a*, adapter 66*b* with color indicia 67*b*, adapter 66*c* with color indicia 67*c* and adapter 66*d* with color indicia 67*d*. The correlation of color coding relative to adapter type may be provided by a key, or may become widely known in the industry, e.g., through industry practice, thereby allowing a user to easily identify the adapter needed for a particular device/application.

Of note, system 50 advantageously permits travel/translation of loop 62 of wire 60 along cable 52. The extent of travel/translation is limited by connector 14. Relative motion of wire 60 relative to cable 52 enhances the ability of users to position an adapter 66 for insertion relative to an electronic device (not pictured) using the disclosed system. In addition, the flexibility afforded users by allowing loop 62 to be formed in the field allows the portion of the system associated with wire 60 to be movably secured relative to a cable 52 selected by the user based on site-specific considerations, e.g., the accessibility and expected functionality of cable 52 as compared to other cable(s) that may be available at the site.

Figure 3A:
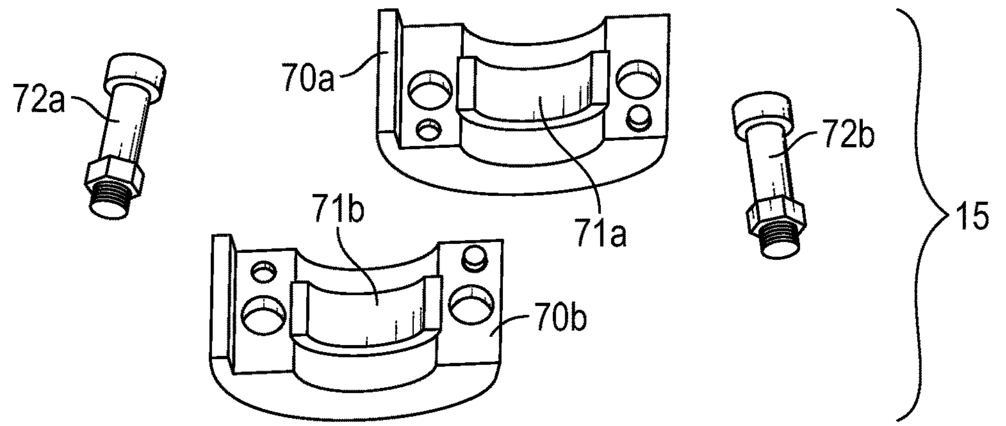
FIG. 3A depicts component parts of a coupler/stop in a disassembled state according to the present disclosure.
Figure 3B:
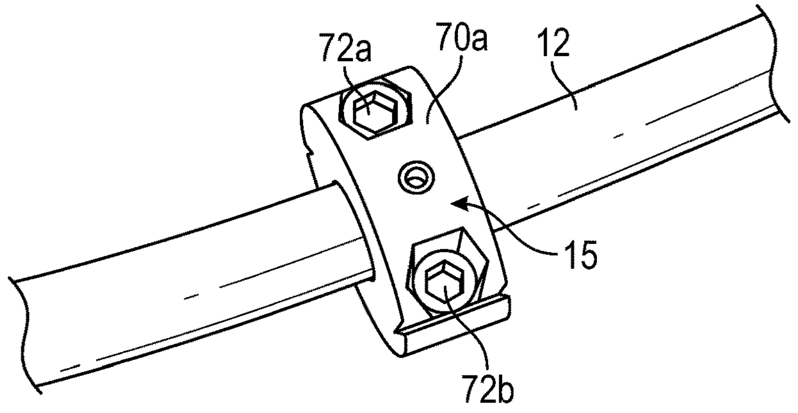
FIG. 3B depicts a coupler/stop in an assembled state and mounted with respect to a cable according to the present disclosure.
Figure 3C:
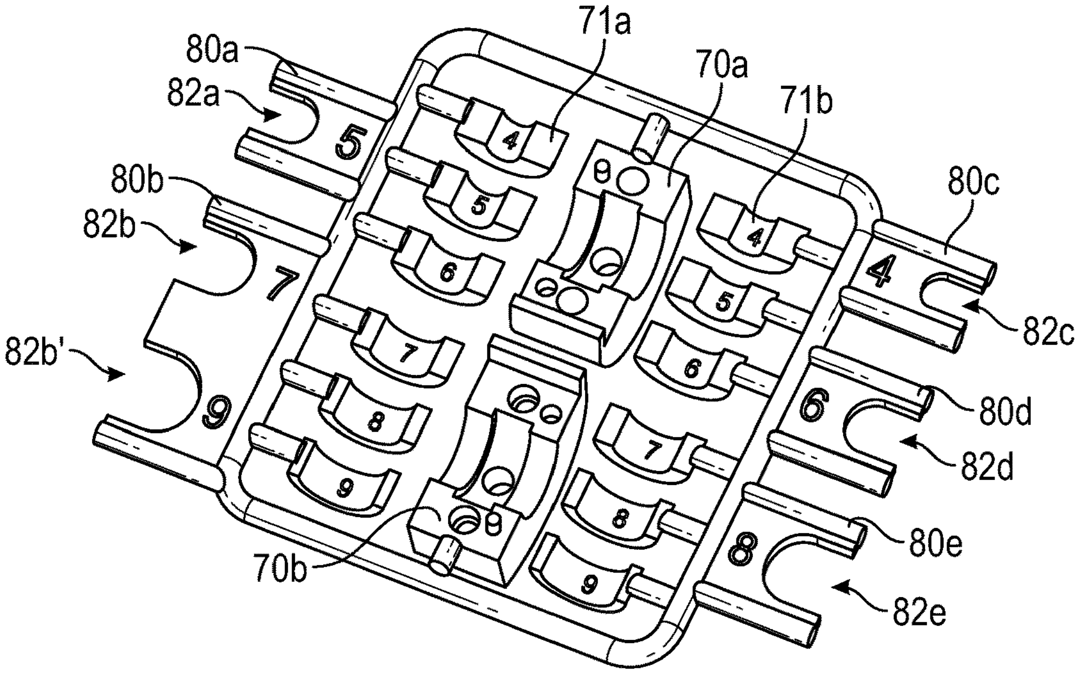
FIG. 3C depicts component parts of a coupler/stop and cable gauges according to the present disclosure.

FIGS. 3A, 3B and 3C depict exemplary components and assembly aspects of forming optional coupler/stop 15 relative to elongated cable 12, as shown in FIG. 1. With initial reference to FIG. 3A, first and second mating portions 70*a*, 70*b* are depicted in a side-by-side orientation, with securement screws 72*a*, 72*b* adjacent thereto. Each of the mating portions 70*a*, 70*b* includes an insert 71*a*, 71*b* that adjusts the inner diameter of coupler/stop 15, when assembled. The inserts 71*a*, 71*b* are selected based on the diameter of the cable 12 to which coupler/stop 15 is to be secured.

FIG. 3B depicts coupler/stop 15 assembled relative to cable 12, with securement screws 72*a*, 72*b* positioned within the cooperative openings associated with mating portions 70*a*, 70*b*.

With reference to FIG. 3C, an exemplary assemblage of component parts associated with coupler/stop 15 is shown. The individual inserts 71*a*, 71*b* depicted in FIG. 3C are of varying sizes, thereby accommodating different cable diameters. The differentiation amongst the inserts is shown in FIG. 3C as "4", "5", "6", "7", "8" and "9". By designing the mating portions 70*a*, 70*b* of coupler/stop 15 to accommodate inserts 71*a*, 71*b* of differing diameters, the flexibility in manufacture and implementation of the coupler/stop in the field is greatly enhanced.

According to exemplary embodiments of the present disclosure, cable gauge tools 80*a*, 80*b*, 80*c*, 80*d*, 80*e* may be provided in association with the other coupler/stop components. Each of the cable gauge tools may include an identifying indicia, as depicted in FIG. 3C. Thus, for example, cable gauge tool 80*a* includes printed indicia "5" which correlates the semi-circular opening 82*a* with appropriate inserts that also bear the printed indicia "5". Similarly, cable gauge 80*d* includes printed indicia "4" that correlates semicircular opening 82*d* with inserts that bear the indicia "4". In the exemplary embodiment depicted in FIG. 3C, two (2) distinct semi-circular openings 82*b* and 82*b*' are associated with cable gauge tool 80*b*. As is apparent, it is possible to incorporate different sized semi-circular openings with a single cable gauge tool to facilitate ease of manufacture, etc. The inner diameter of the inserts 71*a*, 71*b* take into consideration cladding thickness associated with cables that are measured using semi-circular openings 82*a*, 82*b*, 82*c*, 82*d*, 82*e*. The present disclosure is not limited by or to six (6) distinct cable diameters (as are measured by semi-circular openings 82*a*-82*e*) and six distinct insert sizes 71*a*, 71*b*, but may be increased or decreased in number as circumstances require.

Figure 4:
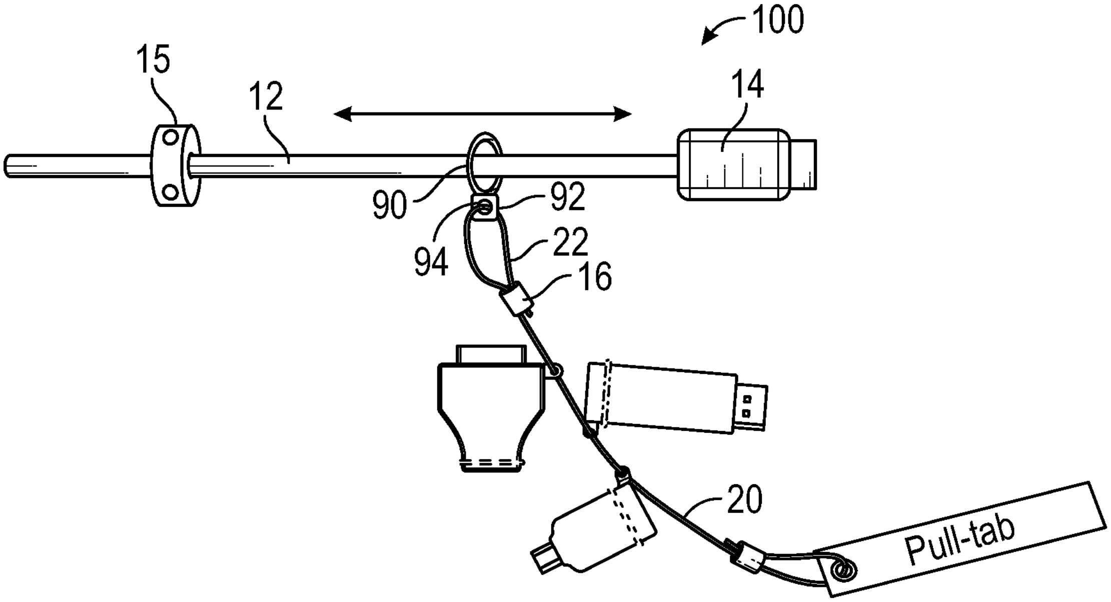
FIG. 4 is a perspective view of a further alternative exemplary system for providing access to a plurality of adapters according to the present disclosure.
Figure 5:
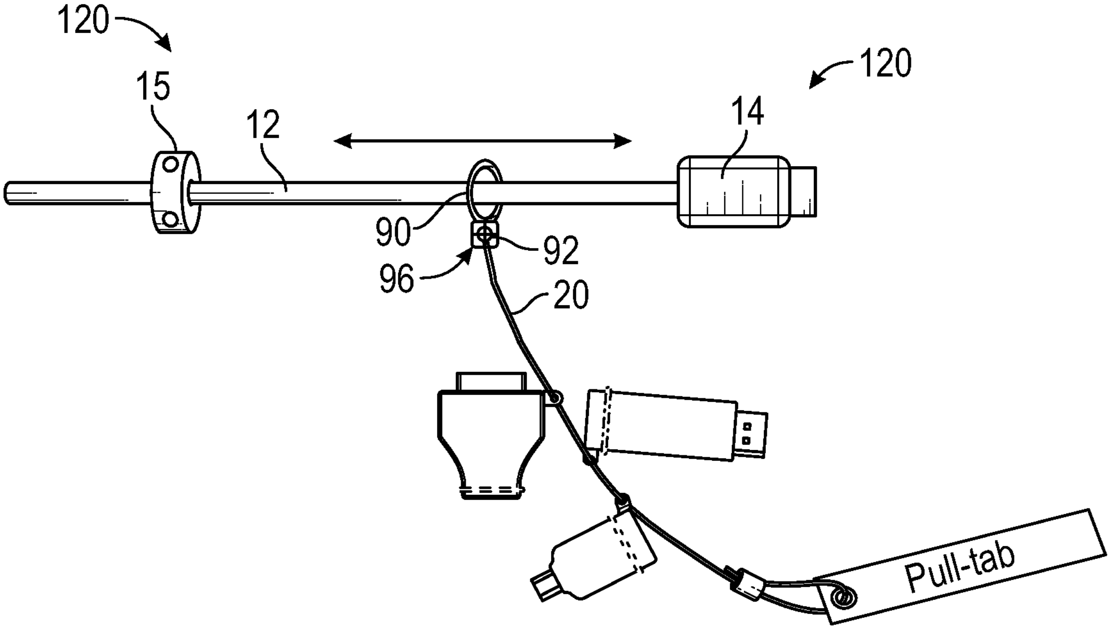
FIG. 5 is a perspective view of an additional alternative exemplary system for providing access to a plurality of adapters according to the present disclosure.

Turning to FIGS. 4 and 5, further exemplary systems for providing access to adapters are provided. The systems depicted in FIGS. 4 and 5 differ from each other and from system 10 depicted in FIG. 1 only in the manner in which wire 20 is movably mounted with respect to cable 12. Accordingly, the description herein addresses only the differences relative to system 10 described with reference to FIG. 1, with like reference numbers used for components that are unchanged relative to system 10 in FIG. 1.

With reference to FIG. 4, system 100 includes wire 20 that is movably mounted with respect to cable 12 by way of a ring 90 that is positioned around cable 12 and that defines a tab extension 92 with an aperture 94 formed therein. Wire 20 is secured to ring 90 by passing the free end thereof through aperture 94 of tab extension 92 and then securing coupler 16 to an overlapping region of wire 20. Coupler 16 may be advantageously fixed relative to wire 20 in the field, i.e., by a user of the disclosed system. Of note, ring 90 is positioned on/around cable 12 before coupler/stop 15 is mounted with respect to cable 12 and, once coupler/stop 15 is mounted to cable 12, travel of ring 90 relative to cable 12 is limited by connector 14 at one end and by coupler/stop 15 at the other end.

With reference to FIG. 5, system 120 includes wire 20 that is movably mounted with respect to cable 12 by way of a ring 90 that is positioned around cable 12 and that defines a tab extension 92. Wire 20 is secured to ring 90 by a fixation technique, e.g., welding. Thus, ring 90 and wire 20 define a subassembly at the time system 120 is established. As with system 100 in FIG. 4, ring 90 is positioned on/around cable 12 before coupler/stop 15 is mounted with respect to cable 12 and, once coupler/stop 15 is mounted to cable 12, travel of ring 90 relative to cable 12 is limited by connector 14 at one end and by coupler/stop 15 at the other end.

Thus, the present application provides advantageous systems for providing access to one or more adapters, generally a plurality of adapters. The disclosed systems include an elongated wire that supports adapter(s) along the extent thereof. The wire is movably mounted with respect to a cable, e.g., an HDMI cable, according to one of the following structural arrangements:

The wire forms a loop around the cable and a coupler is applied to an overlapping region of the wire, e.g., in the field, to fix the loop in place relative to the cable. A coupler/stop is optionally mounted with respect to the cable to limit travel of the loop/wire relative to the cable.

A ring that defines a tab extension with aperture is movably mounted with respect to the cable, and the wire forms a loop through the aperture in the tab extension. A coupler is applied to an overlapping region of the wire, e.g., in the field, to fix the loop in place relative to the tab extension/ring. A coupler/stop is optionally mounted with respect to the cable to limit travel of the loop/wire relative to the cable.

A ring that defines a tab extension and the wire are joined relative to each other to define a subassembly. The ring is movably mounted with respect to the cable with the wire extending therefrom. A coupler/stop is optionally mounted with respect to the cable to limit travel of the loop/wire relative to the cable.

The adapter(s) are mounted/secured with respect to the wire/cable and may include indicia (e.g., color indicia) that facilitate identification of the adapter type. The adapter(s) may be movably mounted with respect to the wire/cable, and relative movement may be bounded by stops/couplers positioned at either end thereof. At the free end of the wire/cable, a pull-tab may be provided to facilitate interaction with the wire/cable and the associated adapters.

The present disclosure further provides an advantageous coupler/stop that accommodates cables of differing diameters by providing mating portions that receive/accommodate inserts of differing sizes, thereby permitting utilization with a range of cable diameters using the same mating portions.

The various features, functions and structures set forth in the present disclosure may be implemented separately or in combination, in whole or in part. Although the present disclosure has been provided with reference to exemplary embodiments thereof, the present disclosure is not limited by or to such exemplary embodiments. Rather, the present disclosure is susceptible to various modifications, refinements and adjustments without departing from the spirit or scope hereof.

The invention claimed is:

1. A coupler/stop for mounting relative to a cable to limit travel of an element along the cable, the coupler/stop comprising:

a first mating portion configured to be disposed around at least a portion of the cable on a first side of the cable, the first mating portion defining an inner diameter and including a first pair of openings on opposing ends of the first mating portion;

a second mating portion configured to be disposed around at least a portion of the cable on a second side of the cable opposing the first side of the cable, the second mating portion defining an inner diameter and including a second pair of openings on opposing ends of the second mating portion;

a first insert configured to be disposed on the first mating portion to adjust the inner diameter of the first mating portion;

a second insert configured to be disposed on the second mating portion to adjust the inner diameter of the second mating portion; and a pair of screws configured to be positioned within the first and second pair of openings associated with the first and second mating portions to fixedly secure the first and second mating portions around the cable to prevent movement of the first and second mating portions relative to the cable;

wherein in a fixed position of the first and second mating portions relative to the cable, the element freely moves along the cable relative to the first and second mating portions with the first and second mating portions acting as a stop to limit travel of the element along the cable.

2. The coupler/stop according to claim 1, further comprising a wire gauge tool.

3. The coupler/stop according to claim 2, wherein the wire gauge tool includes a plurality of semi-circular openings for measurement of a diameter of the cable for selection of a size of the first and second inserts to adjust the inner diameter of the first and second mating portions to be complementary to the diameter of the cable.

4. The coupler/stop according to claim 1, wherein the pair of screws are configured to secure the first and second mating portions around and to the cable.

5. The coupler/stop according to claim 1, wherein each of the first and second mating portions defines a semicircular configuration.

6. The coupler/stop according to claim 1, wherein a diameter of the first and second inserts is selectable based on a diameter of the cable.

7. The coupler/stop according to claim 1, wherein each of the first and second inserts defines a semicircular configuration.

8. The coupler/stop according to claim 1, wherein the first and second pair of openings of the first and second mating portions are configured to cooperate with each other to receive the pair of screws.

9. The coupler/stop according to claim 1, wherein the first and second inserts are interchangeable depending on a diameter of the cable.

10. The coupler/stop according to claim 1, wherein each of the first and second mating portions include a groove configured to at least partially receive the respective first and second inserts.

11. A coupler/stop system, comprising:

a coupler/stop configured to be mounted relative to a cable to limit travel of an element along the cable, the coupler/stop including:

a first mating portion configured to be disposed around at least a portion of the cable on a first side of the cable, the first mating portion defining an inner diameter and including a first pair of openings on opposing ends of the first mating portion;

a second mating portion configured to be disposed around at least a portion of the cable on a second side of the cable opposing the first side of the cable, the second mating portion defining an inner diameter and including a second pair of openings on opposing ends of the second mating portion;

a housing including multiple pairs of inserts, each of the multiple pairs of inserts including (i) a first insert configured to be disposed on the first mating portion to adjust the inner diameter of the first mating portion, and (ii) a second insert configured to be disposed on the second mating portion to adjust the inner diameter of the second mating portion; and means for securing the first and second mating portions to each other and to the cable with one of the pair of inserts positioned therewithin to prevent movement of the first and second mating portions relative to the cable;

wherein in a fixed position of the first and second mating portions relative to the cable, the element freely moves along the cable relative to the first and second mating portions with the first and second mating portions acting as a stop to limit travel of the element along the cable.

12. The coupler/stop system according to claim 11, wherein each of the multiple pairs of inserts defines a different diameter.

13. The coupler/stop system according to claim 11, wherein the means for securing the mating portions includes a pair of screws.

14. The coupler/stop system according to claim 11, wherein the means for securing the first and second mating portions to each other and to the cable are configured to secure the first and second mating portions and one of the pairs of inserts around the cable.

15. The coupler/stop system according to claim 11, wherein the housing includes an integrated cable gauge tool.

16. The coupler/stop system according to claim 15, wherein the integrated cable gauge tool includes a plurality of semicircular openings for measurement of a diameter of the cable for selection of a size of the first and second inserts to adjust the inner diameter of the first and second mating portions to be complementary to the diameter of the cable.

17. The coupler/stop system according to claim 16, wherein the plurality of semicircular openings correlate with respective pairs of inserts of the multiple pairs of inserts.

18. The coupler/stop system according to claim 17, wherein the pairs of inserts are selectable based on a corresponding diameter of the cable.

* * * * *